US009436017B2

(12) United States Patent
Sato

(10) Patent No.: US 9,436,017 B2
(45) Date of Patent: Sep. 6, 2016

(54) IMAGE STABILIZING APPARATUS THAT CORRECTS IMAGE BLUR CAUSED BY HAND SHAKE, LENS BARREL, AND OPTICAL APPARATUS

(75) Inventor: Takehiko Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/291,909

(22) Filed: Nov. 8, 2011

(65) Prior Publication Data

US 2012/0120492 A1    May 17, 2012

(30) Foreign Application Priority Data

Nov. 11, 2010   (JP) ................................ 2010-252858

(51) Int. Cl.
*G02B 27/64* (2006.01)
*H04N 5/225* (2006.01)
*H04N 5/232* (2006.01)

(52) U.S. Cl.
CPC .......... *G02B 27/646* (2013.01); *H04N 5/2254* (2013.01); *H04N 5/2328* (2013.01)

(58) Field of Classification Search
CPC .... G02B 27/646; G02B 27/64; G02B 27/04; G02B 27/02; G03B 5/00; H04N 5/23287; H04N 5/23264; H04N 5/2254
USPC ............ 396/52–55, 14–21, 554; 348/208.99, 348/208.1–208.16; 359/554–557, 52–55
See application file for complete search history.

(56) References Cited

U.S. PATENT DOCUMENTS 5,640,280 A * 6/1997 Lee ................................ 359/824
7,639,301 B2 * 12/2009 Niwamae et al. ............ 348/335
7,742,075 B2 * 6/2010 Kimura ...................... 348/208.7
7,983,546 B2 * 7/2011 Washisu ......................... 396/55
8,139,291 B2 * 3/2012 Nakamura et al. ........... 359/557
8,218,018 B2 * 7/2012 Washisu ...................... 348/208.7
8,319,844 B2 * 11/2012 Kimura .................... 348/208.99
8,564,675 B2 * 10/2013 Sato ......................... G03B 5/00
                                                                345/208.11
2008/0129830 A1 * 6/2008 Inoue et al. ............... 348/208.2

FOREIGN PATENT DOCUMENTS

| JP | 02232824 A | * 9/1990 | .............. G11B 7/09 |
| JP | 05-297443 A | 11/1993 | |
| JP | 08184870 A | * 7/1996 | .............. G03B 5/00 |
| JP | 2002-196382 A | 7/2002 | |
| JP | 2008-281949 A | 11/2008 | |
| JP | 2009-145771 A | 7/2009 | |
| JP | 2010-191411 A | 9/2010 | |

* cited by examiner

*Primary Examiner* — Bumsuk Won
*Assistant Examiner* — Tamara Y Washington
(74) *Attorney, Agent, or Firm* — Canon U.S.A., Inc. IP Division

(57) ABSTRACT

An image stabilizing apparatus includes a fixed member, a shift member that holds an image stabilizing lens and are movable in a plane orthogonal to an optical axis, a plurality of shift drivers that are disposed at positions different from each other in the plane orthogonal to the optical axis, a gel that is held by one of the shift member and the fixed member, and a protrusion that is provided on the other one of the shift member and the fixed member. Each of the plurality of shift drivers includes a magnet held by one of the shift member and the fixed member, a coil that is held by the other one of the shift member and the fixed member, and a yoke that is held by the other one of the shift member and the fixed member, and a portion of the protrusion is immersed in the gel.

13 Claims, 9 Drawing Sheets

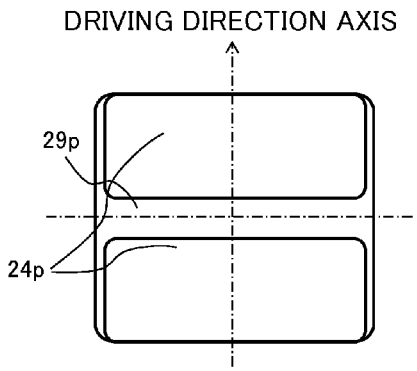
FIG. 5A
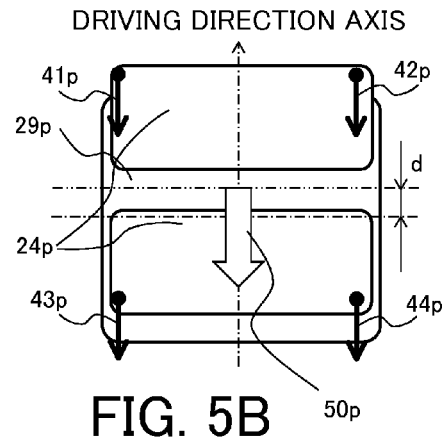
FIG. 5B
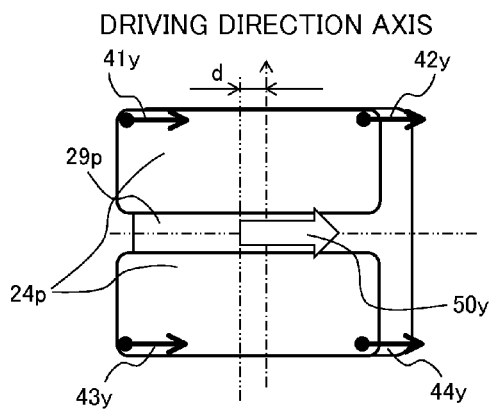
FIG. 5C
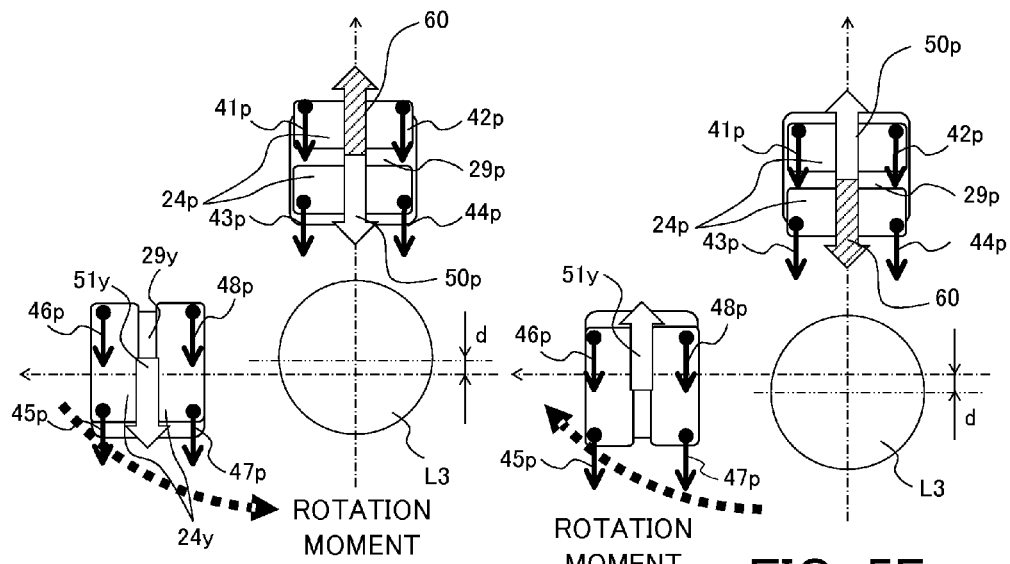
FIG. 5D
FIG. 5E

IMAGE STABILIZING APPARATUS THAT CORRECTS IMAGE BLUR CAUSED BY HAND SHAKE, LENS BARREL, AND OPTICAL APPARATUS

BACKGROUND OF THE INVENTION

1. Field of the Invention

The present invention relates to an image stabilizing apparatus that corrects an image blur caused by hand shake.

2. Description of the Related Art

As one method of correcting a shift of an optical axis that is generated by hand shake at the time of photography to perform an optical image stabilization in a lens barrel of an optical apparatus such as a digital camera, there is a method of performing a shift movement of an image stabilizing lens in a plane orthogonal to the optical axis.

In a shift unit that has two drivers that drive a shift member in a vertical direction (hereinafter, referred to as a "pitch direction") and in a horizontal direction (hereinafter, referred to as a "yaw direction") in the plane orthogonal to the optical axis respectively, a change of a position of one of the drivers causes a generation of a pullback force of the other one of the drivers. Japanese Patent Laid-Open No. 2002-196382 discloses an image stabilizing apparatus that is configured so as to reduce the pullback force in a pitch direction driver. In this image stabilizing apparatus, a yoke is provided with a protrusion shape that is protruded to an optical axis direction. A size of a magnetic force is inversely proportional to square of a distance. Accordingly, when the shift member moves on the plane orthogonal to the optical axis to change the distance between a drive magnet and a protrusion shape, the pullback force applied to the protrusion shape is applied in a direction where the movement is facilitated.

However, since the pullback force is generated in the yaw direction driver even in this case, a moment that rotates the shift member in the plane orthogonal to the optical axis is generated and the shift member freely rotates during the image stabilizing operation. If the shift member contacts a fixed member due to the rotation movement, a collision noise and an image disturbance are generated in some cases. When parts are damaged by the contact, the subsequent drive of the shift member may be affected. Accordingly, an interval between the shift member and the fixed member needs to be widened so that the shift member does not contact the peripheral fixed member even when it rotates. However, this causes an increase of the size of each part and also leads to an increase of the size of a lens barrel.

Furthermore, if the shift member significantly rotates, characteristics of an output of a position detection sensor change and accurate position detection cannot be performed, and as a result, a so-called crosstalk is generated. The change of the position detection caused by the rotation leads to an oscillation of a feedback position control in some cases, and it causes a deterioration of an optical performance at the time of the image stabilizing operation. For example, Japanese Patent No. 3229899 discloses an image stabilizing apparatus that is provided with a guide shaft for restricting the rotation of the shift member.

However, as disclosed in Japanese Patent No. 3229899, when the guide shaft is provided as a member of suppressing the rotation of the shift member in the plane orthogonal to the optical axis in order to improve a driving performance, the reduction in size of the image stabilizing apparatus is prevented. Additionally, it is difficult to reduce the cost since the number of parts is increased by complicating the configuration of the apparatus.

SUMMARY OF THE INVENTION

The present disclosure provides an image stabilizing apparatus that suppresses a deterioration of a driving performance of a shift unit to improve an image stabilization performance.

An image stabilizing apparatus as one aspect of the present invention includes a fixed member, a shift member configured to hold an image stabilizing lens and to be movable in a plane orthogonal to an optical axis with respect to the fixed member, a plurality of shift drivers that are disposed at positions different from each other in the plane orthogonal to the optical axis, a gel that is held by one of the shift member and the fixed member, and a protrusion that is provided on the other one of the shift member and the fixed member. Each of the plurality of shift drivers includes a magnet that is held by one of the shift member and the fixed member, a coil that is held by the other one of the shift member and the fixed member, and a yoke that is held by the other one of the shift member and the fixed member, and at least a portion of the protrusion is immersed in the gel.

A lens barrel as another aspect that includes the image stabilizing apparatus.

An optical apparatus as another aspect that includes the lens barrel.

Further features and aspects will become apparent from the following description of exemplary embodiments with reference to the attached drawings.

BRIEF DESCRIPTION OF THE DRAWINGS

FIGS. 5A to 5E are illustrations of describing a pullback force of a shift unit in a conventional art.

DESCRIPTION OF THE PREFERRED EMBODIMENTS

Figure 1:
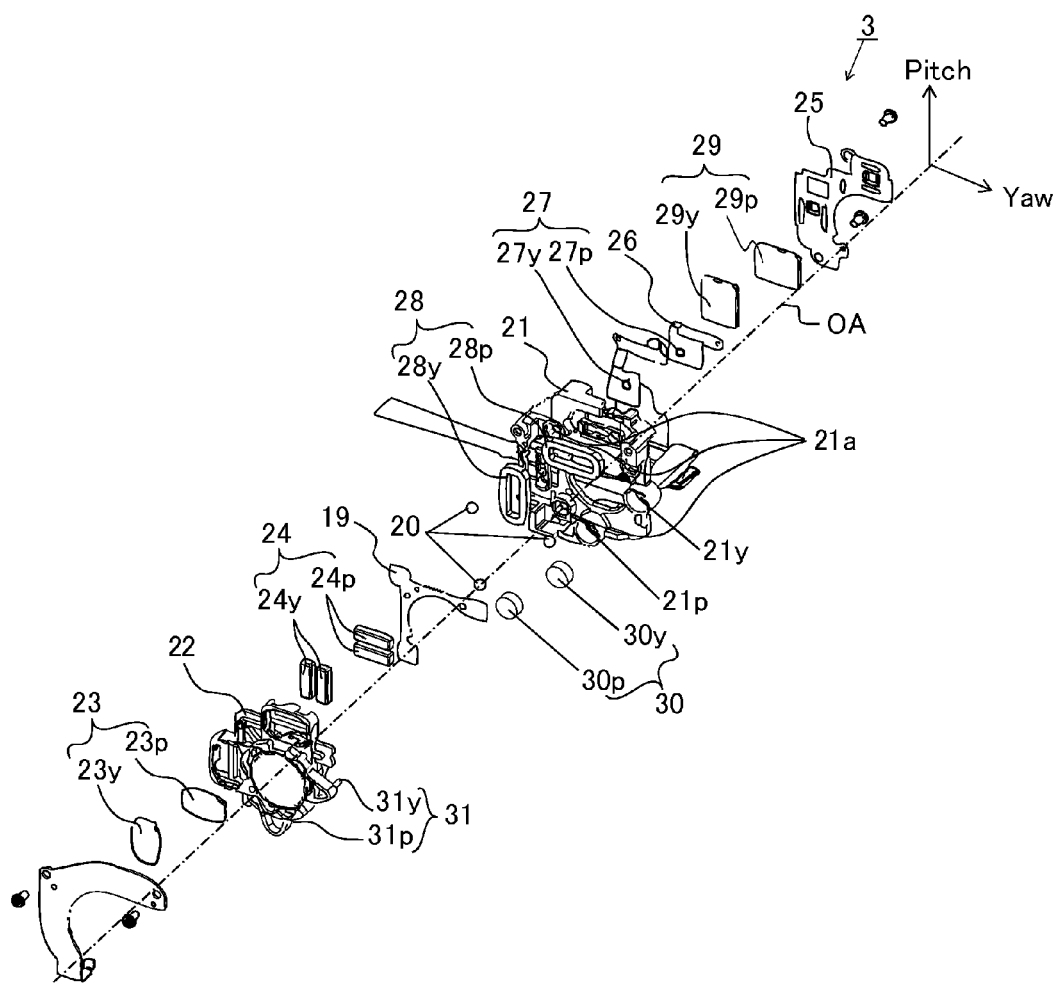
FIG. 1 is an exploded perspective view of a shift unit in the present embodiment.

Exemplary embodiments will be described below with reference to the accompanied drawings. In each of the drawings, the same elements will be denoted by the same reference numerals and the duplicate descriptions thereof will be omitted.

Figure 2:
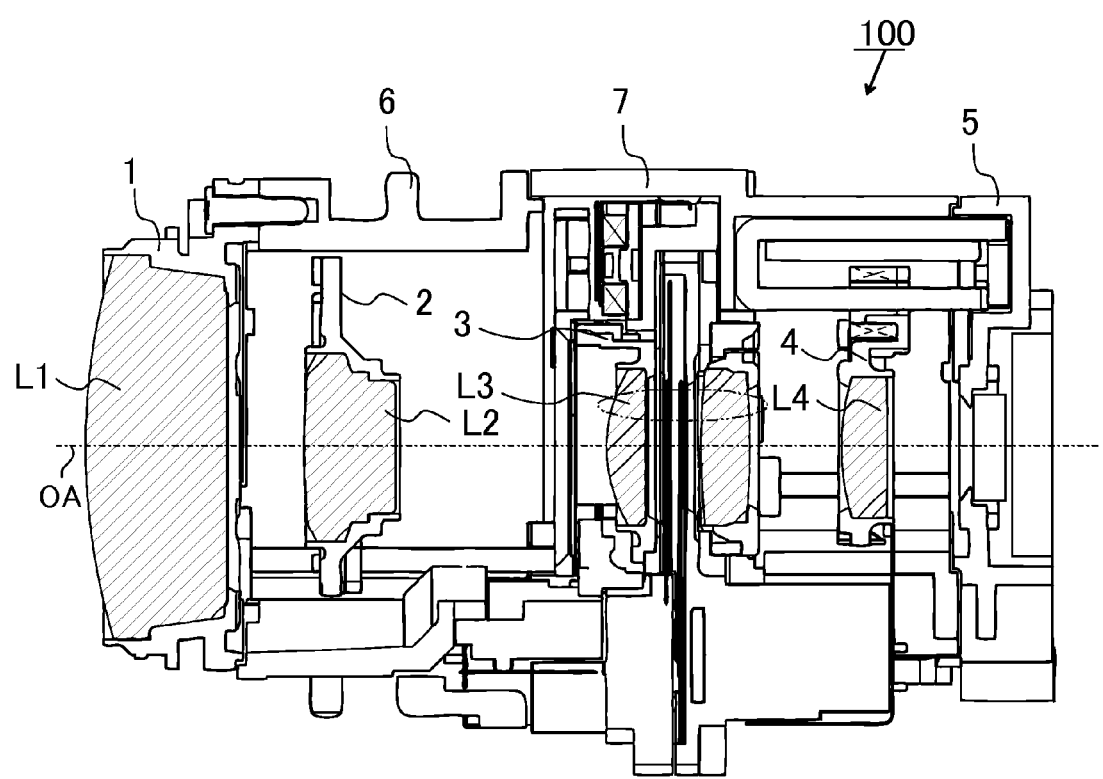
FIG. 2 is a cross-sectional view of a lens barrel that includes the shift unit in the present embodiment.
Figure 3:
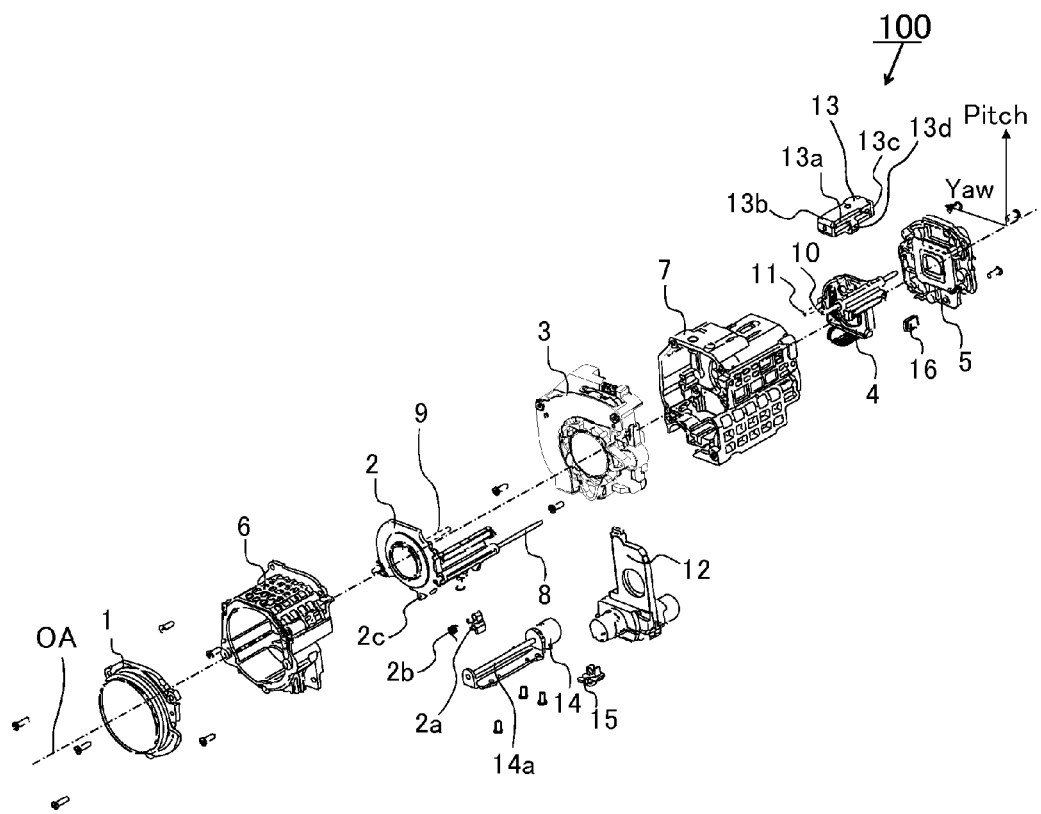
FIG. 3 is an exploded perspective view of the lens barrel that includes the shift unit in the present embodiment.

Referring to FIGS. 2 and 3, a lens barrel that includes a shift unit in an embodiment will be described. FIG. 2 is a cross-sectional view of a lens barrel 100 that includes the shift unit in the present embodiment, and FIG. 3 is an exploded perspective view of the lens barrel 100. The lens barrel 100 of the present embodiment is attached to an image pickup apparatus (an optical apparatus) such as a video camera or a digital still camera or is configured integrally with the image pickup apparatus to be used. The lens barrel 100 is a lens barrel that has a magnification varying optical system of a four-unit configuration of convex, concave, convex, and convex lenses. Reference numeral L1 denotes a first lens unit that is fixed, and reference numeral L2 denotes a second lens unit that moves in a direction of an optical axis OA, i.e. in an optical axis direction, to perform a magnification varying operation. Reference numeral L3 denotes a third lens unit that moves in a plane orthogonal to the optical axis OA, i.e. in an optical axis orthogonal plane, to perform an image stabilizing operation. Reference numeral L4 denotes a fourth lens unit that moves in the optical axis direction to perform an in-focus operation.

Reference numeral 1 denotes a fixed barrel that holds the first lens unit L1, and reference numeral 2 denotes a second lens unit moving frame that holds the second lens unit L2. Reference numeral 3 denotes a shift unit (an image stabilizing apparatus) that moves the third lens unit L3 in the optical axis orthogonal plane. Reference numeral 4 denotes a fourth lens unit moving frame that holds the fourth lens unit L4, and reference numeral 5 denotes a CCD holder to which an image pickup element such as a CCD is fixed. The fixed barrel 1 is locked on a front fixed barrel 6 by screws, and the CCD holder 5 and the front fixed barrel 6 are locked on a rear fixed barrel 7 by screws. Reference numerals 8, 9, 10, and 11 denote guide bars, and the guide bars 8, 9, 10, and 11 are positioned and fixed by the front fixed barrel 6 and the rear fixed barrel 7. The guide bars 8 and 9 support the second lens unit moving frame 2 so as to be movable in the optical axis direction. The guide bars 10 and 11 support the fourth lens unit moving frame 4 so as to be movable in the optical axis direction. The shift unit 3 is positioned and fixed to the rear fixed barrel 7 by screws.

Reference numeral 12 denotes a stop device that changes an aperture diameter of an optical system. The stop device 12 is a so-called guillotine stop device that moves two stop blades in directions opposite to each other to change the aperture diameter. Reference numeral 13 denotes a VCM (a voice coil motor) that drives the fourth lens unit L4 in the optical axis direction to perform an in-focus operation. The VCM 13 is configured by including a magnet 13a, yokes 13b and 13c, and a coil 13d, and carries electric current to the coil 13d to generate Lorentz force in the coil 13d to drive the coil 13d in the optical axis direction. The coil 13d is fixed to the fourth lens unit moving frame 4, and the fourth lens unit moving frame 4 is driven in the optical axis direction at the same time of driving the coil 13d.

Reference numeral 14 denotes a zoom motor that drives the second lens unit L2 in the optical axis direction to perform the magnification varying operation. The zoom motor 14 includes a lead screw 14a that has the same shaft as a shaft of a rotor that rotates. A rack 2a that is attached to the second lens unit moving frame 2 is engaged with the lead screw 14a, and the second lens unit L2 is driven in the optical axis direction by the rotation of the rotor. A torsion coil spring 2b moves the backlash of each of the second moving frame 2, the guide bars 8 and 9, the rack 2a, and the lead screw 14a to one side, and prevents the backlashes of these fittings or engagements. The VCM 13 is configured so that the yoke 13b is pressed to be fixed to the rear fixed barrel 7 and the magnet 13a and the yoke 13c are fixed to the yoke 13b by a magnetic force. The zoom motor 14 is fixed to the rear fixed barrel 7 by two screws.

Reference numeral 15 denotes a photo interrupter that optically detects a movement of a light shielding portion 2c formed on the second lens unit moving frame 2 in the optical axis direction. The photo interrupter 15 is used as a zoom reset switch that detects the second lens unit L2 being located at a reference position. Reference numeral 16 denotes an optical sensor that is configured by including a light-emitting portion and a light-receiving portion. The optical sensor 16 illuminates light from the light-emitting portion onto a scale (not shown) that is adhesively fixed to the fourth lens unit moving frame 4 and read its reflected light by the light-receiving portion of the optical sensor 16 to detect the position of the fourth lens unit L4.

Figure 4:
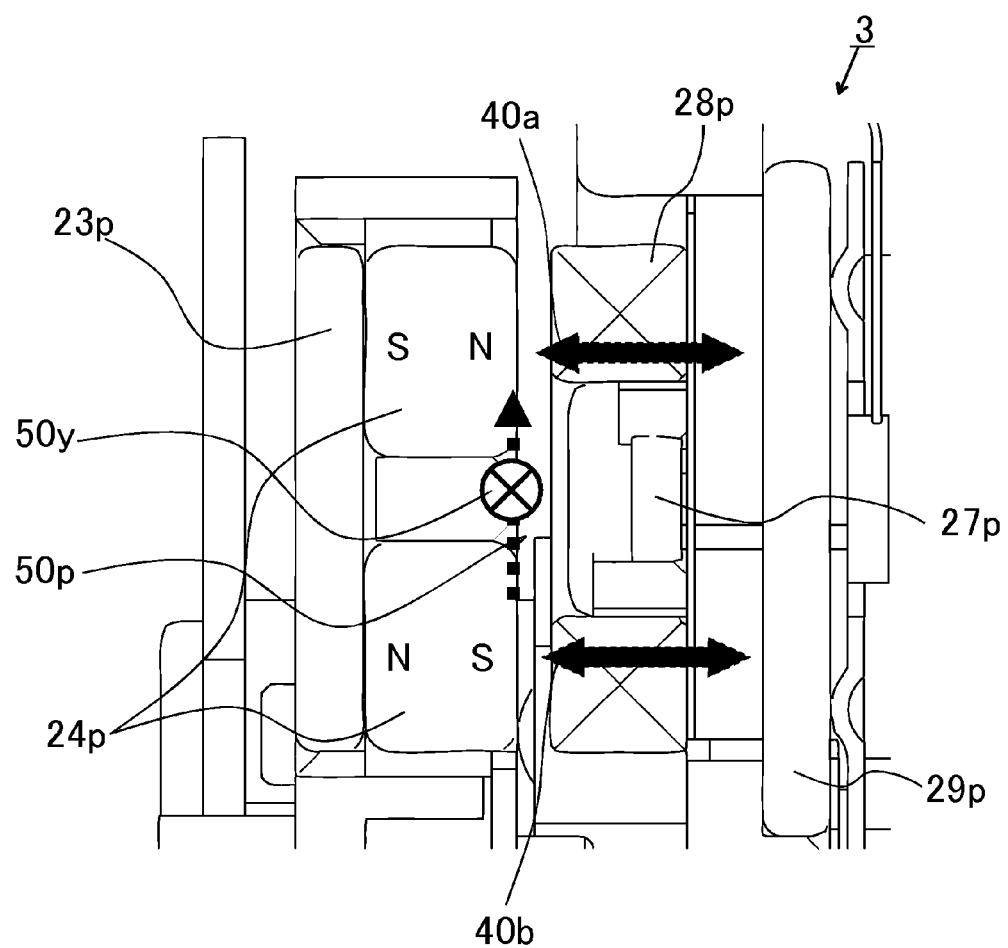
FIG. 4 is a cross-sectional detail view of a pitch direction driver of the shift unit in the present embodiment.

Next, referring to FIGS. 1 to 4, a configuration of the shift unit 3 that moves the third lens unit L3 in the optical axis orthogonal plane will be described. FIG. 1 is an exploded perspective view of the shift unit 3. FIG. 4 is a cross-sectional detail view of a pitch direction driver of the shift unit 3, which illustrates a vertical cross section parallel to the optical axis which is obtained by enlarging the pitch direction driver in a case where a center of the third lens unit L3 (an image stabilizing lens unit) is on the optical axis. A vertical direction of the lens barrel is the pitch direction (a direction of an arrow Pitch in FIG. 1), and a lateral direction of the lens barrel is a yaw direction (a direction of an arrow Yaw in FIG. 1).

The third lens unit L3 is driven in the optical axis orthogonal plane by a drive actuator that corrects an image blur caused by an angle change in the pitch direction and by a drive actuator that corrects an image blur caused by an angle change in the yaw direction. Each actuator is independently controlled to be driven based on information obtained from each of position sensors and shake detection sensors in the pitch direction and in the yaw direction. The drive actuator and the position sensor in the pitch direction and the drive actuator and the position sensor in the yaw direction are disposed so as to be at an angle of 90 degrees with each other. In this regard, these configurations themselves are the same, and therefore the embodiment will only describe the configuration of the pitch direction. Unless otherwise described, indexes p and y are indicated for elements in the pitch direction and in the yaw direction respectively in the present embodiment.

Reference numeral 22 denotes a shift moving frame (a shift member) that holds the third lens unit L3 (the image stabilizing lens unit) and that is movable in the optical axis orthogonal plane with respect to a shift base 21 (a fixed member) in order to stabilize an image. A magnet 24 (a drive magnet) that is used for both the drive and the position detection is pressed into the shift moving frame 22 to be held. Since the magnet 24 is pressed into the shift moving frame 22 to be assembled, a relative position relation between the shift moving frame 22 and the magnet 24 is not displaced after the assembly. Therefore, the position of the magnet 24 that also has a position detection function is determined at a position that is fixed with respect to the shift moving frame 22 that holds the third lens unit L3, and therefore the position of the third lens unit L3 can be exactly detected by the magnet 24.

Figure 9:
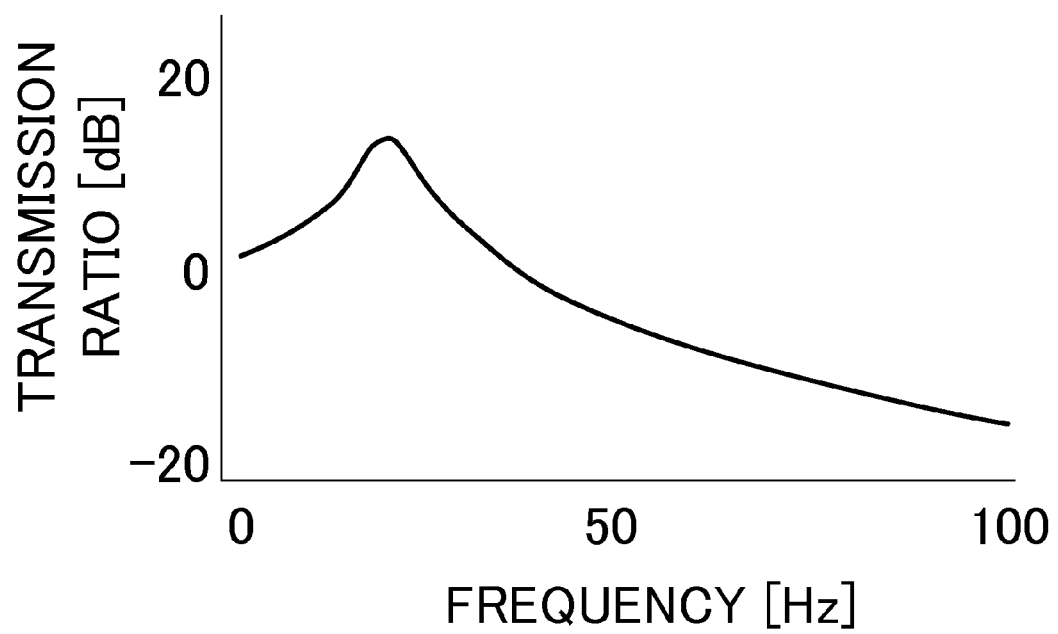
FIG. 9 is one example of vibration absorbing characteristics of the gel in the present embodiment.

A part of the shift moving frame 22 is provided with pins 31p and 31y. The shift base 21 is provided with concave-shaped gel holders 21p and 21y, and gels 30p and 30y are placed and held inside the gel holders 21p and 21y respectively. As a material of the gels 30p and 30y, silicone having a viscoelastic force, a viscoelastic property, or the like is used. The gels 30p and 30y, for example, have vibration absorption characteristics (a relation between a transmission ratio and a frequency) as illustrated in FIG. 9. At least parts of the pins 31$p$ and 31$y$ contact the gels 30$p$ and 30$y$, respectively. Therefore, the shift base 21 is coupled to the shift moving frame 22 via the gels 30$p$ and 30$y$. As described below, when the shift moving frame 22 moves, a moment that rotates the shift moving frame 22 in the optical axis orthogonal plane is generated by the reaction force received by the pins 31$p$ and 31$y$ that presses the gels 30$p$ and 30$y$ respectively.

The material of the gels 30$p$ and 30$y$ is not limited to silicone, but other materials having a viscoelastic force such as butyl rubber, neoprene rubber, fluorine-containing rubber, Hanenaito rubber (manufactured by Naigai Rubber Industry Co., Ltd.), or foam rubber may also be used.

In the present embodiment, the pins 31$p$ and 31$y$ are provided on the shift moving frame 22 and the gel holders 21$p$ and 21$y$ that hold the gels 30$p$ and 30$y$ respectively are provided on the shift base 21, but the present embodiment is not limited to this. The pins can also be provided on the shift base 21 and the gel holders that hold the gels can also be provided on the shift moving frame 22. In other words, the gels only have to be held by one of the shift moving frame 22 and the shift base 21, and also the pins only have to be provided on the other one of the shift moving frame 22 and the shift base 21.

Reference numeral 20 denotes a ball that is disposed between the shift base 21 and a metal plate 19. In the present embodiment, three balls 20 are disposed around the optical axis in the optical axis orthogonal plane, but the number of balls 20 is not limited to this. The metal plate 19 is disposed between the balls 20 and the shift moving frame 22. Since the metal plate 19 is disposed, applying dents by the balls 20 to the shift moving frame 22 that is a mold part when the lens barrel 100 is shocked or the deterioration of driving characteristics of the shift unit 3 caused by the friction that is generated by an image stabilization drive for a long time can be prevented. As a material of the metal plate 19, for example stainless steel or the like is suitably used. The ball 20 is rotatably held by the ball holder 21$a$ formed on the shift base 21. The shift moving frame 22 moves in the optical axis orthogonal plane by rolling motions of the three balls 20 in the optical axis orthogonal plane.

A magnetic absorption force is applied between the magnet 24 and a fixed yoke 29. The ball 20 surely contacts the shift base 21 (an end surface of the ball holder 21$a$ in the optical axis direction) and the shift moving frame 22 (the metal plate 19), i.e. the ball 20 is held between the shift base 21 and the shift moving frame 22, by this magnetic absorption force. Thus, the shift moving frame 22 is biased in a direction approaching the shift base 21 by the magnetic absorption force, and the three balls 20 contact the three end surfaces of the ball holders 21$a$ in the optical axis direction and three regions of the metal plate 19 in a pressing state. Each of the surfaces on which the three balls 20 contact spreads in an optical axis orthogonal direction (an optical axis orthogonal plane) of the image pickup optical system. Nominal diameters of the three balls 20 are the same each other. Therefore, when a position difference in the optical axis direction between the end surfaces of the three ball holders 21$a$ in the optical axis direction is suppressed to be small, the third lens unit L3 that is held by the shift moving frame 22 can be moved in the optical axis orthogonal plane without inclining the third lens unit L3 with respect to the optical axis. As a material of the ball 20, for example, a non-magnetic material such as SUS304 is suitably used.

Next, an actuator that drives the shift moving frame 22 and the third lens unit L3 will be described. As illustrated in FIG. 4, reference numeral 24$p$ denotes a magnet for which a bipolar magnetization has been performed in a radial direction from an optical axis OA, and reference numeral 23$p$ denotes a yoke that closes magnetic flux at a front side of the optical axis direction. The yoke 23$p$ is adhesively fixed to the magnet 24$p$. Reference numeral 28$p$ denotes a coil that is adhesively fixed to a shift base 21, and reference numeral 29$p$ denotes a fixed yoke that closes magnetic flux at a rear side of the optical axis direction. The fixed yoke 29$p$ is disposed at a side opposite to the magnet 24$p$ with respect to the coil 28$p$, and is held by the shift base 21. A magnetic circuit is formed by the magnet 24$p$, the yoke 23$p$, the fixed yoke 29$p$, and the coil 28$p$ to constitute the actuator (a shift driver). As a material that is used as these yokes, a magnetic material such as SPCC (Steel Plate Cold Commercial) that has high magnetic permeability is suitably used. When electric current is applied to the coil 28$p$, Lorentz force is generated in a direction substantially orthogonal to a magnetized boundary of the magnet 24$p$ by a mutual repulsion of magnetic field lines that is generated in the magnet 24$p$ and the coil 28$p$, and it moves the shift moving frame 22 in the optical axis orthogonal plane. Thus, the actuator of the present embodiment is a so-called moving magnet-type actuator.

The actuators having such configurations are disposed in a longitudinal direction and a lateral direction respectively. In other words, the two actuators (the shift drivers) are disposed so as to be orthogonal to each other in the optical axis orthogonal plane. Therefore, the two actuators can drive the shift moving frame 22 in two optical axis orthogonal directions that are substantially orthogonal to each other (in the optical axis orthogonal plane). The shift moving frame 22 can be freely moved in a predetermined range in the optical axis orthogonal plane by the resultant driving force of the longitudinal direction and the lateral direction. In the present embodiment, when viewed in the optical axis direction, the gel holder 21$p$ of the two gel holders is provided at aside opposite to one of the two shift drivers (the magnet 24$p$, the yoke 23$p$, the fixed yoke 29$p$, and the coil 28$p$) with respect to a center of the shift moving frame 22. Similarly, when viewed in the optical axis direction, the gel holder 21$y$ of the two gel holders is provided at a side opposite to the other one of the two shift drivers (the magnet 24$y$, the yoke 23$y$, the fixed yoke 29$y$, and the coil 28$y$) with respect to the center of the shift moving frame 22. The friction that is generated during the movement of the shift moving frame 22 in the optical axis orthogonal plane is only rolling frictions that are generated between the ball 20 and the metal plate 19 and between the ball 20 and the ball holder 21$a$ as long as the ball 20 does not contact a wall of the ball holder 21$a$. Accordingly, although the magnetic absorption force described above is applied, the shift moving frame 22 that holds the third lens unit L3 is smoothly movable in the optical axis orthogonal plane and a fine control of a moving amount of it can also be performed. Lubricant is applied to the ball 20 to be able to further reduce the frictional force.

Next, position detections of the shift moving frame 22 and the third lens unit L3 will be described. Reference numeral 27$p$ denotes a hall element that converts magnetic flux density into an electric signal, which is soldered on a flexible printed cable (hereinafter, referred to as an "FPC") 26. The FPC 26 is positioned and fixed on the shift base 21. An FPC holding fitting 25 is fixed to the shift base 21 by a screw to prevent a floatation of the FPC 26 and also prevent a displacement of the hall element 27$p$. A position sensor that detects the positions of the shift moving frame 22 and the third lens unit L3 is formed by the following configuration.

When the shift moving frame 22 and the third lens unit L3 is driven in the longitudinal direction or the lateral direction, a change of the magnetic flux density is detected to output the electric signal that indicates the change of this magnetic flux density. A control circuit (not shown) can detect the positions of the shift moving frame 22 and the third lens unit L3 based on the output of the hall element 27p. The magnet 24p is used as a position detecting magnet as well as a driving magnet.

The magnetic absorption force applied between the magnet 24p and the fixed yoke 29p is, as indicated by Coulomb's law, proportional to strength of magnetic charges of two objects and to an inverse of square of a distance between the two objects. Therefore, when the magnet 24p is located at a center position of the driver, the magnetic absorption forces of the pitch direction and the yaw direction are balanced in respective directions. In other words, magnetic absorption forces 40a and 40b that are applied between the magnet 24p and the fixed yoke 29p are balanced, and a position relation between the magnet 24p and the fixed yoke 29p is determined. In this case, a pullback force 50p in the pitch direction is nearly equal to zero, and a pullback force 50y in the yaw direction is also nearly equal to zero.

Next, referring to FIGS. 5A to 5E, a relation between the movement of a shift unit and a pullback force by a magnetic absorption force in a conventional art will be described. FIGS. 5A to 5C illustrate a shift driver in the pitch direction, and FIGS. 5D and 5E are illustrations in which the shift driver and the shift unit in the pitch direction and the yaw direction respectively are viewed from a front side (an object side) of the shift unit. In FIGS. 5A to 5E, members other than the magnet 24, the fixed yoke 29, and the third lens unit L3 (the image stabilizing lens unit) are omitted. Pullback forces that are applied to four corners of the magnet 24p are referred to as pullback forces 41 to 44 respectively as illustrated in FIGS. 5A to 5E. Similarly, pullback forces that are applied to four corners of the magnet 24y are referred to as pullback forces 45 to 48.

FIG. 5A illustrates a shift driver of the pitch direction in a case where a center of the third lens unit L3 is on the optical axis. In this case, since the magnet 24p is located at a center position with respect to the fixed yoke 29p, the pullback forces 41 to 44 at the four corners are balanced. In other words, the pullback force 50p of the pitch direction and the pullback force 50y of the yaw direction are substantially equal to zero. FIG. 5B illustrates the shift driver of the pitch direction in a case where the center of the third lens unit L3 is moved by a distance d in a pitch upward direction. The position relation between the magnet 24p and the fixed yoke 29p are changed from the state illustrated in FIG. 5A, and the pullback force 50p is applied. In other words, a force in a direction in which a state attempts to go back to the state of FIG. 5A that is magnetically stable is applied. In this case, since shapes of the magnet 24p and the fixed yoke 29p are symmetrical with respect to a driving direction, sizes of the pullback forces 41p and 42p are substantially equal to each other, and sizes of the pullback forces 43p and 44p are substantially equal to each other. Since the magnet 24p does not move in the yaw direction, the pullback force 50y is substantially equal to zero, similarly to the case of FIG. 5A.

Next, FIG. 5C is the shift driver of the pitch direction in a case where the center of the third lens unit L3 is moved by distance d in the yaw direction. Also in this case, the position relation between the magnet 24p and the fixed yoke 29p is changed, and the pullback force 50y is generated. In other words, a force in a direction in which a state attempts to go back to the state of FIG. 5A that is magnetically stable is applied. In this case, since the shapes of the magnet 24p and the fixed yoke 29p are symmetrical with respect to a driving direction, sizes of the pullback forces 41y and 43y are substantially equal to each other, and sizes of the pullback forces 42y and 44y are substantially equal to each other. Since the magnet 24p does not move in the pitch direction, the pullback force 50p is substantially equal to zero, similarly to the case of FIG. 5A.

FIG. 5D illustrates a case in which the center of the third lens unit L3 is moved by distance d in the pitch direction. As described with reference to FIG. 5B, the pullback force 50p of the pitch direction is applied to the magnet 24p, but the shift moving frame 22 can be moved by Lorentz force 60 that is generated by carrying electric current to the coil 28p. On the other hand, the pullback force 51y is applied to the magnet 24y at the yaw side as described with reference to FIG. 5C. A rotation moment (a dotted arrow) around an axis that is parallel to the optical axis is applied to the shift moving frame 22 by the pullback force 51y as illustrated in FIG. 5D. As a result, a rolling movement in a counterclockwise direction is generated in the shift moving frame 22. Then, the shift moving frame 22 is stopped at a position where all of the rotation moment, the pullback force, the Lorentz force, and the like are balanced.

FIG. 5E illustrates a case in which the center of the third lens unit L3 is moved by distance d in a direction opposite to the direction of FIG. 5D. Similarly to the case of FIG. 5D, a rotation moment (a dotted arrow) around an axis that is parallel to the optical axis is applied to the shift moving frame 22 by the pullback force 51y that is applied to the magnet 24y and the fixed yoke 29y at the yaw side. As a result, a rolling movement in a clockwise direction is generated in the shift moving frame 22. Then, the shift moving frame 22 is stopped at the position where all of the rotation moment, the pullback force, the Lorentz force, and the like are balanced.

Figure 6A:
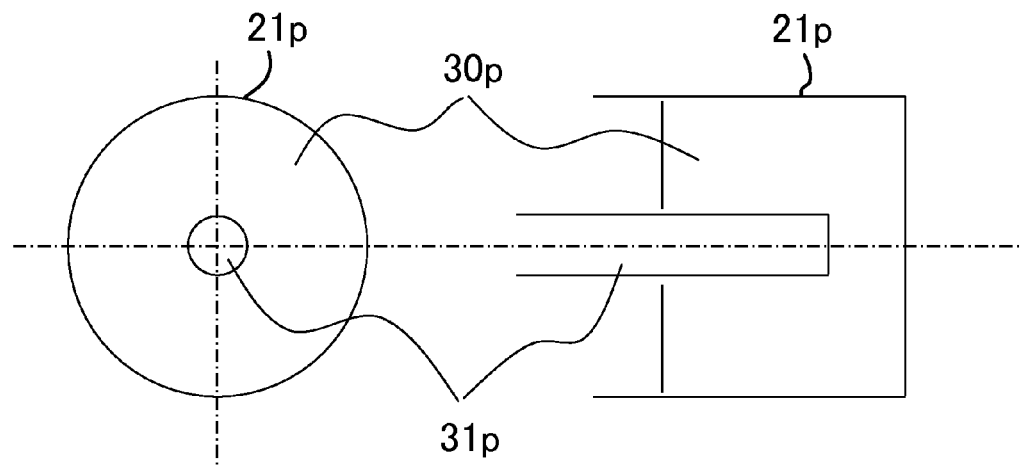
FIGS. 6A and 6B are illustrations of describing a gel connection portion in the present embodiment.
Figure 6B:
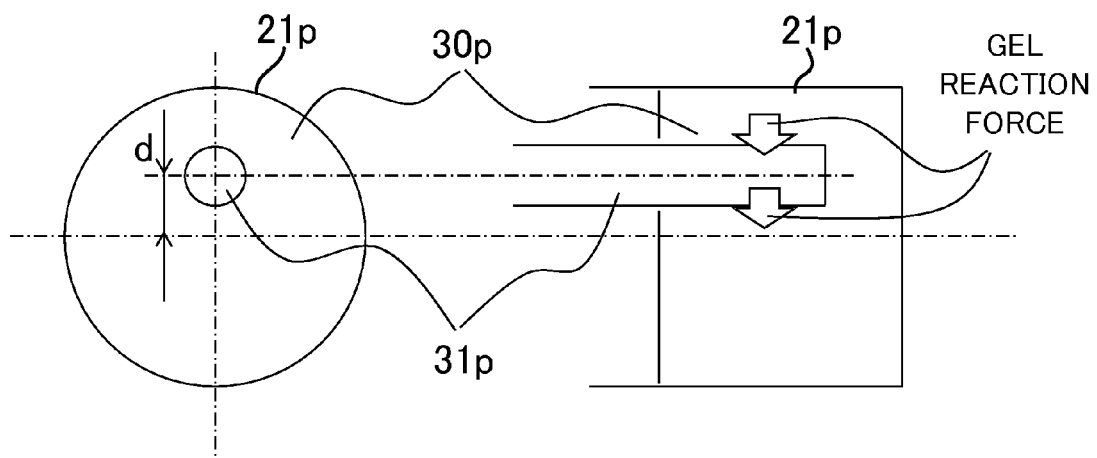
Figure 7A:
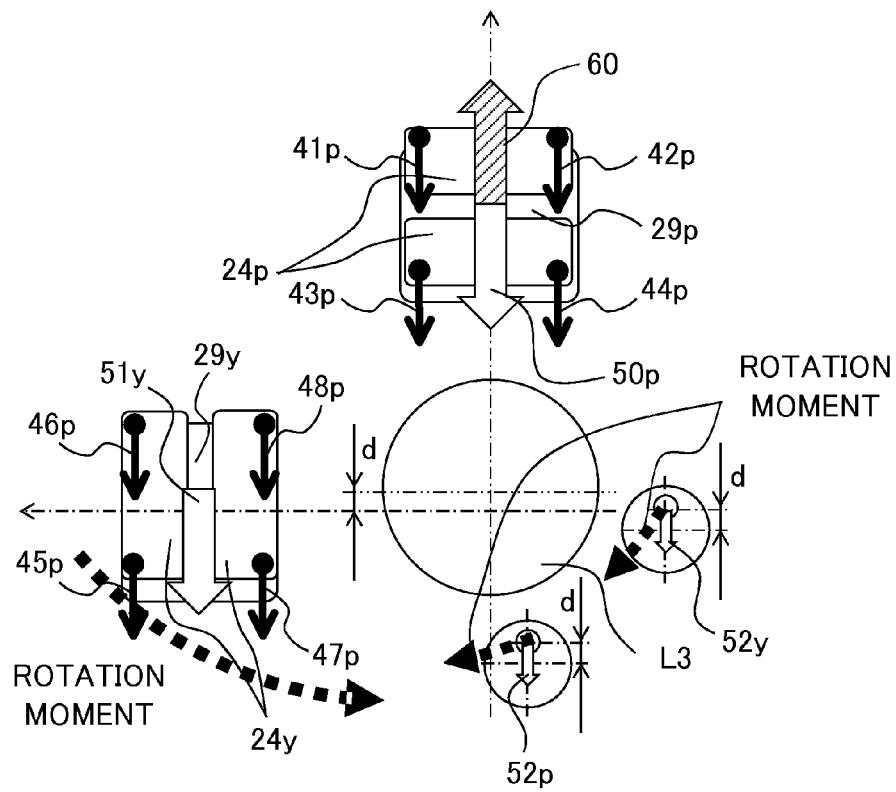
FIGS. 7A and 7B are illustrations of describing a pullback force of the shift unit in the present embodiment.
Figure 7B:
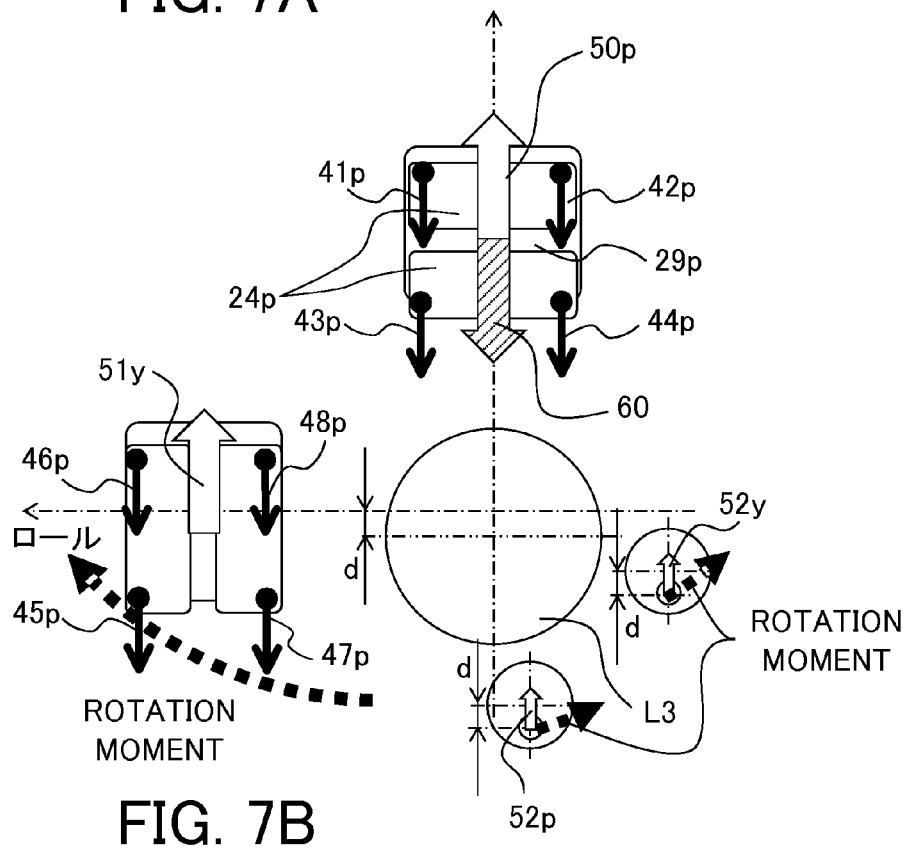

Next, referring to FIGS. 6A, 6B, 7A, and 7B, a relation between the movement of the shift unit and the pullback force generated by the magnetic absorption force in the present embodiment will be described. FIGS. 6A and 6B are illustrations of a gel connection portion in the present embodiment. FIGS. 7A and 7B are illustrations of the pullback force of the shift unit in the present embodiment. In FIGS. 6A, 6B, 7A, and 7B, members other than the gel 30, the pin 31, the magnet 24, the fixed yoke 29, and the third lens unit L3 (the image stabilizing lens unit) are omitted. The gel and the pin in the present embodiment are, as illustrated in FIGS. 7A and 7B, disposed at positions substantially opposed to the shift drivers of the pitch and yaw directions with respect to the optical axis when viewed from the front side of the shift unit (from the object side). In the embodiment, the pullback forces that are applied to the four corners of the magnet 24p are referred to as pullback forces 41 to 44 respectively as illustrated in FIGS. 7A and 7B. Similarly, the pullback forces that are applied to the four corners of the magnet 24y are referred to as pullback forces 45 to 48 respectively.

Center axes of the cylindrical gel holders 21p and 21y that are provided on a part of the shift base 21 are substantially parallel to the optical axis, and the gels 30p and 30y are placed to be held inside the gel holders 21p and 21y, respectively. The pins 31p and 31y are provided on a part of the shift moving frame 22, and center axes of the pins 31p and 31y are substantially parallel to the optical axis. At least parts of the pins 31p and 31y contact the gels 30p and 30y, respectively. Furthermore, at least a portion of the pins 31p and 31y are immersed in the gels 30p and 30y, respectively.

FIG. 6A illustrates a state in which the center of the third lens unit L3 that the shift moving frame 22 holds is coincident with the optical axis. In this case, the center axis of the pin 31$p$ is substantially coincident with the center axis of the gel holder 21$p$. Accordingly, a resultant force of the reaction forces that the pin 31$p$ receives from the gel 30$p$ in the optical axis orthogonal plane is equal to zero. FIG. 6B illustrates a state in which the pin 31$p$ is moved by distance d in the pitch upward direction. In this case, since the pin 31$p$ presses the gel 30$p$ in the pitch upward direction, the reaction force 52$p$ that is a resultant force of the gel is applied to a pitch downward direction. The gel 30$p$ and the pin 31$p$ are described in the embodiment, and similarly a reaction force is applied to the gel 30$y$ and the pin 31$y$ in accordance with a moving direction of the pin.

FIG. 7A illustrates a case in which the center of the third lens unit L3 is moved by distance d in the pitch upward direction by the Lorentz force 60 that is generated by carrying electric current to the coil 28$p$. The pullback force 51$y$ is applied to the magnet 24$y$ at the yaw side as described with reference to FIG. 5C. A rotation moment (a dotted arrow) in a counterclockwise direction around the axis that is parallel to the optical axis is generated in the shift frame 22 by the pullback force 51$y$ as illustrated in FIG. 7A. On the other hand, since the pins 31$p$ and 31$y$ that are parts of the shift moving frame 22 that holds the third lens unit L3 are also moved by distance d in the pitch upward direction, reaction forces 52$p$ and 52$y$ are applied as described with reference to FIGS. 6A and 6B. Therefore, a rotation moment (a dotted arrow) in the clockwise direction around the axis that is parallel to the optical axis is applied. As a result, the rotation moment that is generated by the pullback force is suppressed by the rotation moment that is generated by the reaction force of the gel, and the shift moving frame 22 is stopped at a position where all of the pullback force, the reaction force, the Lorentz force, and the like are balanced. Accordingly, compared to the conventional configuration, the rolling movement of the shift member that is caused by the pullback force 51$y$ is suppressed. FIG. 7B illustrates a case in which the center of the third lens unit L3 is moved by distance d in a direction opposite to the direction of FIG. 7A. Similarly to the case of FIG. 7A, a rotation moment (a dotted arrow) in the clockwise direction by the pullback force 51$y$ is suppressed by a rotation moment (a dotted arrow) in the counterclockwise direction by the reaction forces 52$p$ and 52$y$ of the gels. Then, the shift moving frame 22 is stopped at a position where all of the pullback force, the reaction force, the Lorentz force, and the like are balanced.

As described above, in the movement of the shift moving frame 22 in the pitch direction, the rotation moment that is generated by the pullback force of the magnet at the yaw side and the rotation moment that is generated by the reaction force of the gel always act in directions opposite to each other. Accordingly, even when the shift moving frame 22 moves in either the pitch upward direction and the pitch downward direction, the rolling movement of the shift moving frame 22 is suppressed. The movement in the pitch direction is only described in the above description, but similarly the rolling movement in the yaw direction is also suppressed.

Figure 8:
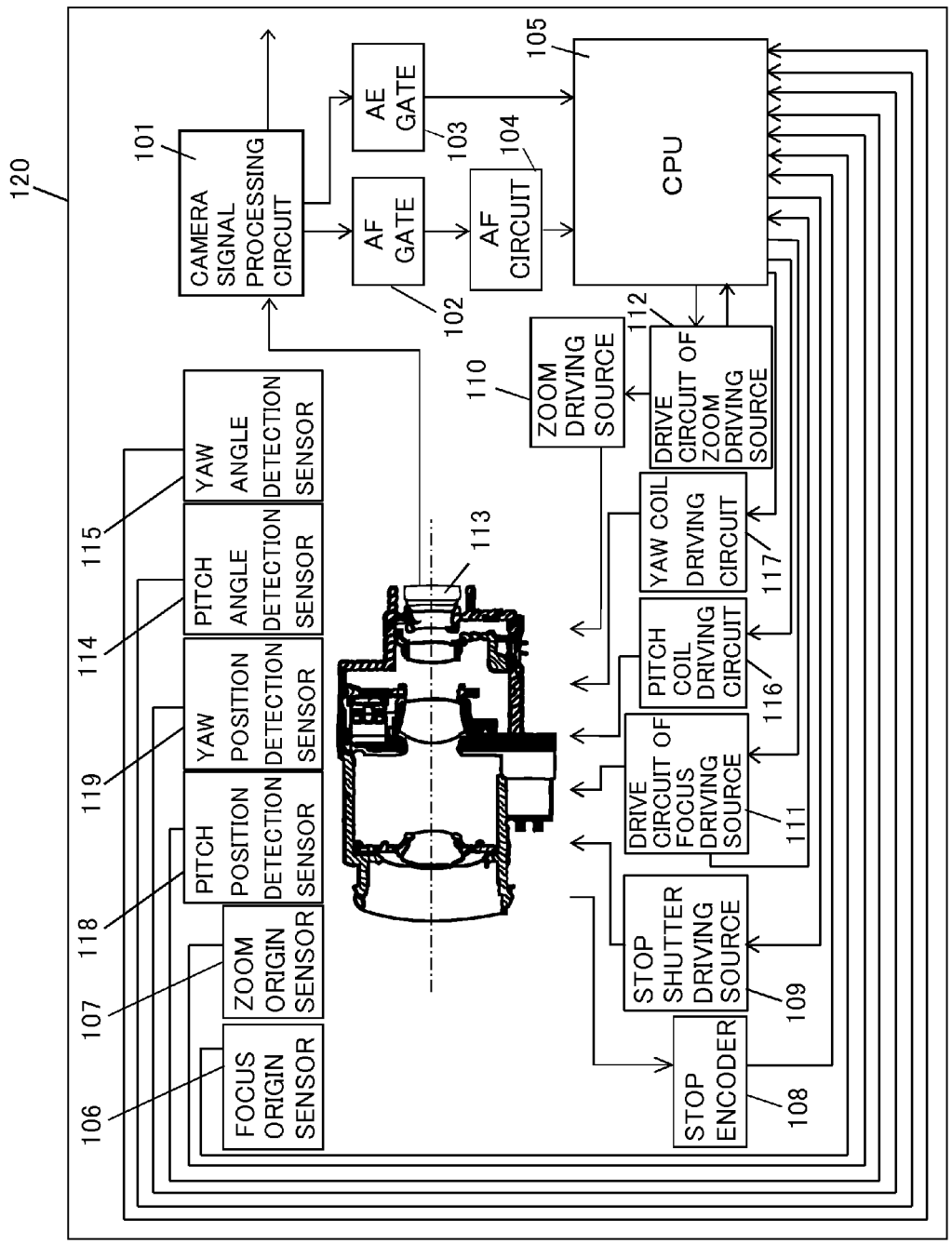
FIG. 8 is an electric block diagram of an optical apparatus that includes the lens barrel in the present embodiment.

Next, referring to FIG. 8, an optical apparatus (an image pickup apparatus) using the lens barrel in the present embodiment will be described. FIG. 8 is an electric block diagram of an optical apparatus 120. In the optical apparatus 120, predetermined processings such as amplification and a gamma correction are performed for an object image that is imaged on a CCD 113 via the lens units (the first lens unit L1 to the fourth lens unit L4) by a camera signal processing circuit 101. A video signal for which these predetermined processings have been performed passes an AF gate 102 or an AE gate 103, and a contrast signal in a predetermined area is taken. Particularly, the contrast signal that passes the AF gate 102 generates one or a plurality of outputs related to a high-frequency component by an AF circuit 104.

A CPU 105 determines whether exposure is optimum or not in accordance with a signal level of the AE gate 103. The CPU 105 drives a stop shutter at the optimum stop value or shutter speed via a stop shutter driving source 109 when the exposure is not optimum. In an autofocus operation, the CPU 105 performs a drive control of a drive circuit 111 of a focus driving source that is a focus driving source so that the output generated by the AF circuit 104 shows a peak. In order to obtain appropriate exposure, the CPU 105 performs a drive control of the stop shutter driving source 109 so that an output of a stop encoder 108 becomes a predetermined value that is an average value of the signal outputs passing the AE gate 103 to control an aperture diameter. The CPU 105 also performs a drive control of a zoom lens unit via a zoom driving source 110 and a drive circuit 112 of the zoom driving source.

A focus origin sensor 106 that uses an encoder such as a photo interrupter detects an absolute reference position for detecting an absolute position of a focus lens unit in the optical axis direction. A zoom origin sensor 107 that uses an encoder such as a photo interrupter detects an absolute reference position for detecting an absolute position of a zoom lens unit in the optical axis direction. The detection of a shake angle in the image pickup apparatus is, for example, performed by integrating an output of an angular velocity sensor such as a vibrating gyroscope that is fixed to the image pickup apparatus. Outputs of a pitch angle detection sensor 114 and a yaw angle detection sensor 115 respectively are processed by the CPU 105. A drive control of a pitch coil driving circuit 116 is performed in accordance with an output from the pitch angle detection sensor 114, and a current-carrying control to the coil 28$p$ is performed. Furthermore, a drive control of a yaw coil driving circuit 117 is performed in accordance with an output from the yaw angle detection sensor 115, and a current-carrying control to the coil 28$y$ is performed. According to the controls described above, the shift moving frame 22 performs a shift movement in the optical axis orthogonal plane.

Outputs of a position detection sensor 118 in the pitch direction and a position detection sensor 119 in the yaw direction respectively are processed by the CPU 105. When the third lens unit L3 that is the image stabilizing lens unit performs a shift movement, a passing light beam in the lens barrel is bent. Then, the shift movement of the third lens unit L3 is performed so that the passing light beam is bent by a bent amount to be compensated in a direction where a shift of the object image on the CCD 113 that is essentially generated by the shake of the image pickup apparatus (the hand shake). According to the configuration, a so-called image stabilization by which a formed object image does not move on the CCD 113 even when the image pickup apparatus is shaken can be performed.

The CPU 105 calculates signals that correspond to differences between shake signals of the image pickup apparatus that are obtained from the pitch angle detection sensor 114 and the yaw angle detection sensor 115 and shift amount signals that are obtained from the position detection sensor 118 in the pitch direction and the position detection sensor 119 in the yaw direction. Then, the CPU 105 performs a shift movement of the shift moving frame 22 by the pitch coil driving circuit 116 and the yaw coil driving circuit 117 based on a signal obtained by performing an amplification and an appropriate phase compensation for this difference signal. According to such controls, the position of the third lens unit L3 is controlled so that the difference signal described above gets smaller to be located at a target position.

In the present embodiment, the case in which the shift moving frame 22 is driven by using a moving magnet-type actuator is described. The present embodiment, however, can also be applied to a so-called moving coil-type actuator in which the coil 28 and the fixed yoke 29 are disposed at the side of the shift moving frame 22 and the yoke 23 and the magnet 24 are disposed at the side of the shift base 21. Furthermore, the present embodiment suppresses a rotational movement of the shift member caused by the pullback force using reaction forces that are applied between two gels and their corresponding pins. The present embodiment, however, may also use one gel and one pin, or three or more gels and their corresponding pins because the reaction force applied between the gel and the pin has only to suppress the rotation moment generated by the pullback force.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-252858, filed on Nov. 11, 2010, which is hereby incorporated by reference herein in its entirety.

What is claimed is:

1. An image stabilizing apparatus comprising:
a fixed member;
a shift member configured to hold an image stabilizing lens and to be movable in a plane orthogonal to an optical axis with respect to the fixed member, the shift member being separated from the fixed member;
a shift driver including a first shift driver and a second shift driver that are disposed at angles different by 90 degrees from each other in the plane orthogonal to the optical axis, the angles being defined when viewed in an optical axis direction in a state where a center of the stabilizing lens is coincident with the optical axis;
a gel that is held by one of the shift member and the fixed member; and
a protrusion that is provided on the other one of the shift member and the fixed member,
wherein each of the first and second shift drivers includes a magnet that is held by one of the shift member and the fixed member, and a coil and a yoke that are held by the other one of the shift member and the fixed member,
wherein when the shift member moves in a direction orthogonal to the optical axis with respect to the fixed member, a positional relationship between the magnet and the yoke is changed,
wherein a magnetic absorption force is applied between the magnet and the yoke such that the shift member is movable in the direction orthogonal to the optical axis while being held with respect to the fixed member in an optical axis direction,
wherein at least a portion of the protrusion is immersed in the gel,
wherein when viewed in the optical axis direction, a first rotation moment and a second rotation moment act in directions opposite to each other, and
wherein, the first rotation moment is a rotation moment generated by a pullback force that acts between the magnet and the yoke constituting each of the first and second shift drivers and that is generated by a movement of the shift member by using the first and second shift drivers, and the second rotation moment is a rotation moment generated by a reaction force received by the partially immersed protrusion pressing the gel.

2. An image stabilizing apparatus comprising:
a fixed member;
a shift member configured to hold an image stabilizing lens and to be movable in a plane orthogonal to an optical axis with respect to the fixed member, the shift member being separated from the fixed member;
a shift driver including a first shift driver and a second shift driver that are disposed at angles different by 90 degrees from each other in the plane orthogonal to the optical axis, the angles being defined when viewed in an optical axis direction in a state where a center of the stabilizing lens is coincident with the optical axis;
a gel that is held by one of the shift member and the fixed member; and
a protrusion that is provided on the other one of the shift member and the fixed member,
wherein each of first and second shift drivers includes a magnet that is held by one of the shift member and the fixed member, and a coil and a yoke that are held by the other one of the shift member and the fixed member,
wherein when the shift member moves in a direction orthogonal to the optical axis with respect to the fixed member, a positional relationship between the magnet and the yoke is changed,
wherein a magnetic absorption force is applied between the magnet and the yoke such that the shift member is movable in the direction orthogonal to the optical axis while being held with respect to the fixed member in the optical axis direction,
wherein at least a portion of the protrusion is immersed in the gel, and
wherein the gel is placed in each of a first gel holder and a second gel holder,
wherein the protrusion includes a first protrusion immersed in the first gel holder and a second protrusion immersed in the second gel holder,
wherein when viewed in the optical axis direction, the first protrusion is provided at an area extending in a direction from the first shift driver to the optical axis and having a width equal to a first magnet in the first shift driver, and
wherein when viewed in the optical axis direction, the second protrusion is provided at an area extending in a direction from the second shift driver to the optical axis and having a width equal to a second magnet in the second shift driver.

3. A lens barrel comprising an image stabilizing apparatus comprising:
a fixed member;
a shift member configured to hold an image stabilizing lens and to be movable in a plane orthogonal to an optical axis with respect to the fixed member, the shift member being separated from the fixed member;
a shift driver including a first shift driver and a second shift driver that are disposed at angles different by 90 degrees from each other in the plane orthogonal to the optical axis, the angles being defined when viewed in an optical axis direction in a state where a center of the stabilizing lens is coincident with the optical axis;

a gel that is held by one of the shift member and the fixed member; and a protrusion that is provided on the other one of the shift member and the fixed member, wherein each of the first and second shift drivers includes a magnet that is held by one of the shift member and the fixed member, and a coil and a yoke that are held by the other one of the shift member and the fixed member, wherein when the shift member moves in a direction orthogonal to the optical axis with respect to the fixed member, a positional relationship between the magnet and the yoke is changed, wherein a magnetic absorption force is applied between the magnet and the yoke such that the shift member is movable in the direction orthogonal to the optical axis while being held with respect to the fixed member in an optical axis direction, wherein at least a portion of the protrusion is immersed in the gel, wherein when viewed in the optical axis direction, a first rotation moment and a second rotation moment act in directions opposite to each other, and wherein, the first rotation moment is a rotation moment generated by a pullback force that acts between the magnet and the yoke constituting each of the first and second shift drivers and that is generated by a movement of the shift member by using the first and second shift drivers, and the second rotation moment is a rotation moment generated by a reaction force received by the partially immersed protrusion pressing the gel.

4. An optical apparatus comprising a lens barrel comprising an image stabilizing apparatus comprising:

a fixed member;

a shift member configured to hold an image stabilizing lens and to be movable in a plane orthogonal to an optical axis with respect to the fixed member, the shift member being separated from the fixed member;

a shift driver including a first shift driver and a second shift driver that are disposed at angles different by 90 degrees from each other in the plane orthogonal to the optical axis, the angles being defined when viewed in an optical axis direction in a state where a center of the stabilizing lens is coincident with the optical axis;

a gel that is held by one of the shift member and the fixed member; and a protrusion that is provided on the other one of the shift member and the fixed member, wherein each of the first and second shift drivers includes a magnet that is held by one of the shift member and the fixed member, and a coil and a yoke that are held by the other one of the shift member and the fixed member, wherein when the shift member moves in a direction orthogonal to the optical axis with respect to the fixed member, a positional relationship between the magnet and the yoke is changed, wherein a magnetic absorption force is applied between the magnet and the yoke such that the shift member is movable in the direction orthogonal to the optical axis while being held with respect to the fixed member in an optical axis direction, wherein at least a portion of the protrusion is immersed in the gel, wherein when viewed in the optical axis direction, a first rotation moment and a second rotation moment act in directions opposite to each other, and wherein, the first rotation moment is a rotation moment generated by a pullback force that acts between the magnet and the yoke constituting each of the first and second shift drivers and that is generated by a movement of the shift member by using the first and second shift drivers, and the second rotation moment is a rotation moment generated by a reaction force received by the partially immersed protrusion pressing the gel.

5. A lens barrel comprising an image stabilizing apparatus comprising:

a fixed member;

a shift member configured to hold an image stabilizing lens and to be movable in a plane orthogonal to an optical axis with respect to the fixed member, the shift member being separated from the fixed member;

a shift driver including a first shift driver and a second shift driver that are disposed at angles different by 90 degrees from each other in the plane orthogonal to the optical axis, the angles being defined when viewed in an optical axis direction in a state where a center of the stabilizing lens is coincident with the optical axis;

a gel that is held by one of the shift member and the fixed member; and a protrusion that is provided on the other one of the shift member and the fixed member, wherein each of first and second shift drivers includes a magnet that is held by one of the shift member and the fixed member, and a coil and a yoke that are held by the other one of the shift member and the fixed member, wherein when the shift member moves in a direction orthogonal to the optical axis with respect to the fixed member, a positional relationship between the magnet and the yoke is changed, wherein a magnetic absorption force is applied between the magnet and the yoke such that the shift member is movable in the direction orthogonal to the optical axis while being held with respect to the fixed member in the optical axis direction, wherein at least a portion of the protrusion is immersed in the gel, and wherein the gel is placed in each of a first gel holder and a second gel holder, wherein the protrusion includes a first protrusion immersed in the first gel holder and a second protrusion immersed in the second gel holder, wherein when viewed in the optical axis direction, the first protrusion is provided at an area extending in a direction from the first shift driver to the optical axis and having a width equal to a first magnet in the first shift driver, and wherein when viewed in the optical axis direction, the second protrusion is provided at an area extending in a direction from the second shift driver to the optical axis and having a width equal to a second magnet in the second shift driver.

6. An optical apparatus comprising a lens barrel an image stabilizing apparatus comprising:

a fixed member;

a shift member configured to hold an image stabilizing lens and to be movable in a plane orthogonal to an optical axis with respect to the fixed member, the shift member being separated from the fixed member;

a shift driver including a first shift driver and a second shift driver that are disposed at angles different by 90 degrees from each other in the plane orthogonal to the optical axis, the angles being defined when viewed in an optical axis direction in a state where a center of the stabilizing lens is coincident with the optical axis;

a gel that is held by one of the shift member and the fixed member; and
a protrusion that is provided on the other one of the shift member and the fixed member,
wherein each of first and second shift drivers includes a magnet that is held by one of the shift member and the fixed member, and a coil and a yoke that are held by the other one of the shift member and the fixed member,
wherein when the shift member moves in a direction orthogonal to the optical axis with respect to the fixed member, a positional relationship between the magnet and the yoke is changed,
wherein a magnetic absorption force is applied between the magnet and the yoke such that the shift member is movable in the direction orthogonal to the optical axis while being held with respect to the fixed member in the optical axis direction,
wherein at least a portion of the protrusion is immersed in the gel, and
wherein the gel is placed in each of a first gel holder and a second gel holder,
wherein the protrusion includes a first protrusion immersed in the first gel holder and a second protrusion immersed in the second gel holder,
wherein when viewed in the optical axis direction, the first protrusion is provided at an area extending in a direction from the first shift driver to the optical axis and having a width equal to a first magnet in the first shift driver, and
wherein when viewed in the optical axis direction, the second protrusion is provided at an area extending in a direction from the second shift driver to the optical axis and having a width equal to a second magnet in the second shift driver.

7. The image stabilizing apparatus according to claim 2, wherein the first gel holder and the second gel holder are disposed at angles different by 90 degrees from each other, the angles being defined when viewed in the optical axis direction in the state where the center of the stabilizing lens is coincident with the optical axis.

8. The image stabilizing apparatus according to claim 1, wherein the shift member includes the magnet and the protrusion, and the fixed member includes the coil and the yoke and a gel holder which holds the gel.

9. The image stabilizing apparatus according to claim 1, wherein the shift member is biased toward the fixed member by the magnetic absorption force rather than by an elastic force.

10. The image stabilizing apparatus according to claim 1, wherein the protrusion includes a first protrusion and a second protrusion that are disposed at angles different by approximately 90 degrees from each other in the plane orthogonal to the optical axis.

11. The image stabilizing apparatus according to claim 2, wherein the shift member includes the first magnet, the second magnet, the first protrusion, the second protrusion, and the fixed member includes the coil, the yoke, the first gel holder, the second gel holder.

12. The image stabilizing apparatus according to claim 2, wherein the shift member is biased toward the fixed member by the magnetic absorption force rather than by an elastic force.

13. The image stabilizing apparatus according to claim 2, wherein the first protrusion and the second protrusion are disposed at angles different by approximately 90 degrees from each other in the plane orthogonal to the optical axis.

\* \* \* \* \*